United States Patent [19]
Booth et al.

[11] Patent Number: 5,609,185
[45] Date of Patent: Mar. 11, 1997

[54] VALVE INDICATOR AND HANDLE ASSEMBLY

[75] Inventors: Walter Booth, East Hanover; Alan R. Levin, Somerville, both of N.J.

[73] Assignee: H-Tech, Inc., Wilmington, Del.

[21] Appl. No.: 455,321

[22] Filed: May 31, 1995

[51] Int. Cl.⁶ .................................................. F16K 37/00
[52] U.S. Cl. ........................................ 137/556; 251/331
[58] Field of Search .................................. 137/556, 553; 251/331, 267, 268, 269

[56] References Cited

U.S. PATENT DOCUMENTS

| | | |
|---|---|---|
| D. 273,034 | 3/1984 | Higgins . |
| D. 281,808 | 12/1985 | Lemkin et al. . |
| D. 301,917 | 6/1989 | Ogasawara et al. . |
| D. 328,945 | 8/1992 | Aarthun et al. . |
| D. 332,823 | 1/1993 | Bonnell . |
| D. 333,698 | 3/1993 | Gottwald . |
| 2,091,618 | 8/1937 | Szabo ..................................... 137/556 |
| 2,853,270 | 9/1958 | Boteler ................................... 251/331 |
| 2,977,981 | 4/1961 | Jarrett ..................................... 137/553 |
| 3,134,570 | 5/1964 | Jarrett ..................................... 137/556 |
| 3,654,962 | 4/1972 | Fredd et al. . |
| 3,826,461 | 7/1974 | Summerfield et al. . |
| 4,044,990 | 8/1977 | Summerfield . |
| 4,051,865 | 10/1977 | Cocking et al. ........................ 137/556 |
| 4,303,222 | 12/1981 | Campbell . |
| 4,316,482 | 2/1982 | Pearce et al. ........................... 137/556 |
| 4,671,490 | 6/1987 | Kolenc et al. .......................... 251/267 |
| 4,702,275 | 10/1987 | Ballun et al. ........................... 137/556 |
| 4,899,783 | 2/1990 | Yusko, Jr. et al. . |
| 5,004,011 | 4/1991 | Linder et al. ........................... 137/556 |

*Primary Examiner*—James Larson
*Attorney, Agent, or Firm*—Selitto & Associates

[57] ABSTRACT

An actuator for actuating a valve from a first position to a second position includes a housing and a rotatable stem mounted within the housing and restricted from moving axially. The actuator also includes a non-rotatable plunger engaging the stem such that the plunger moves axially in response to rotation of the stem, whereby the valve is actuated from the first position to the second position. The actuator is also provided with a non-rotatable indicator member, which is mounted within the housing and through which the stem extends. The indicator member engages the stem such that the indicator member moves axially in response to rotation of the stem. A viewing window is formed in a wall of the housing such that the indicator member can be seen through the window for indicating the first position and the second position of the valve.

27 Claims, 5 Drawing Sheets

VALVE INDICATOR AND HANDLE ASSEMBLY

FIELD OF THE INVENTION

The present invention relates to valve indicator and handle assemblies and, more particularly, to a valve indicator and handle assembly adapted for visually indicating the position of an associated valve.

BACKGROUND OF THE INVENTION

Actuators for actuating a valve between a valve open position and a valve closed position have been equipped with an indicator for indicating the valve open position and the valve closed position. For instance, U.S. Pat. No. 4,899,783 discloses a pinch valve equipped with an actuator having an indicator mechanism. More particularly, the valve includes an actuating member reciprocably mounted within a body of the valve and adapted to effect opening and closing of the valve. The valve also includes an indicator stem fixedly attached to one end of the actuating member such that the indicator stem reciprocates conjointly with the actuating member. In the valve open position, the indicator stem extends outwardly through an opening formed in a closure cap of the valve and, as a result, becomes visible through a transparent shroud formed on the closure cap, thereby indicating the valve open position. Likewise, in the valve closed position, the indicator stem is retracted from the opening and, as a result, is not visible through the shroud, thereby indicating the valve closed position.

Indicator mechanisms, such as the one disclosed in the foregoing patent, have various disadvantages. For example, because the indicator stem is immovably attached to the reciprocating actuator member and therefore reciprocates back and forth through the opening as the valve is opened and closed, it is necessary to provide the valve with an external shroud in order to accommodate the indicator stem. Due to such an external shroud, it is difficult to make the indicator compact. In addition, because the actuating member reciprocates as the valve is opened and closed, the types of handles that may be provided for the associated valve are limited.

SUMMARY OF THE INVENTION

The present invention overcomes the disadvantages and shortcomings of the prior art device discussed above by providing a new and improved actuator adapted for indicating a valve open position and a valve closed position in a compact design. More particularly, the actuator includes a housing and a rotatable stem mounted within the housing and restricted from moving axially. In accordance with one aspect of the present invention, the actuator is provided with a non-rotatable plunger mounted within the stem and threadedly engaged therewith such that the plunger moves axially in response to rotation of the stem, whereby the valve is actuated from the valve open position to the valve closed position and vice versa.

In accordance with another aspect of the present invention, the actuator is provided with a non-rotatable indicator member, which is mounted within the housing and through which the stem extends. The indicator member engages the stem such that the indicator member moves axially between a first position and a second position in response to rotation of the stem. A viewing window is formed in a wall of the housing such that the indicator member can be seen through the window. In operation, the indicator member is in axial alignment with the window when the indicator member is in its first position, whereby the indicator member is visible through the window and thereby indicates the valve closed position. When, on the other hand, the indicator member is in its second position, it is out of axial alignment with the window, whereby the indicator member is not visible through the window and thereby indicates the valve open position.

BRIEF DESCRIPTION OF THE DRAWINGS

For a better understanding of the present invention, reference is made to the following description of an exemplary embodiment of the invention considered in conjunction with the accompanying drawings, in which.

DETAILED DESCRIPTION EXEMPLARY EMBODIMENT

Although the present invention can be used in connection with various types of valves, actuators, etc., it is particularly suitable for use in a manual diaphragm valve. Accordingly, the present invention will be described hereinafter in connection with such a manual diaphragm valve. It should be understood, however, that the following description is only meant to be illustrative of the present invention and is not meant to limit the scope of the present invention which has applicability to valves, actuators, etc. other than a manual diaphragm valve.

Figure 1:
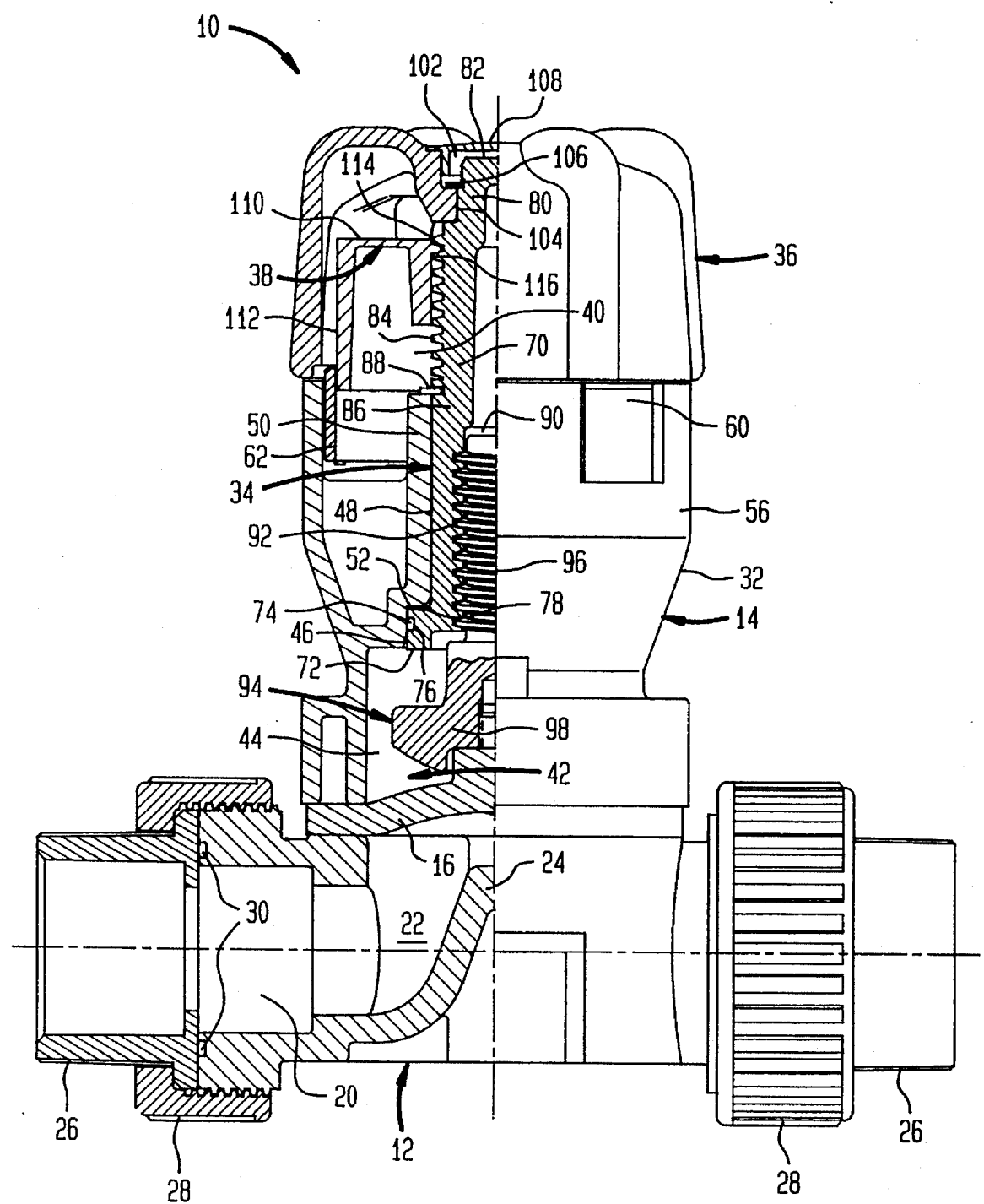
FIG. 1 is a partial cross-sectional schematic elevational view of a diaphragm valve which is equipped with an actuator constructed in accordance with the present invention, the valve being in a valve open position.
Figure 2:
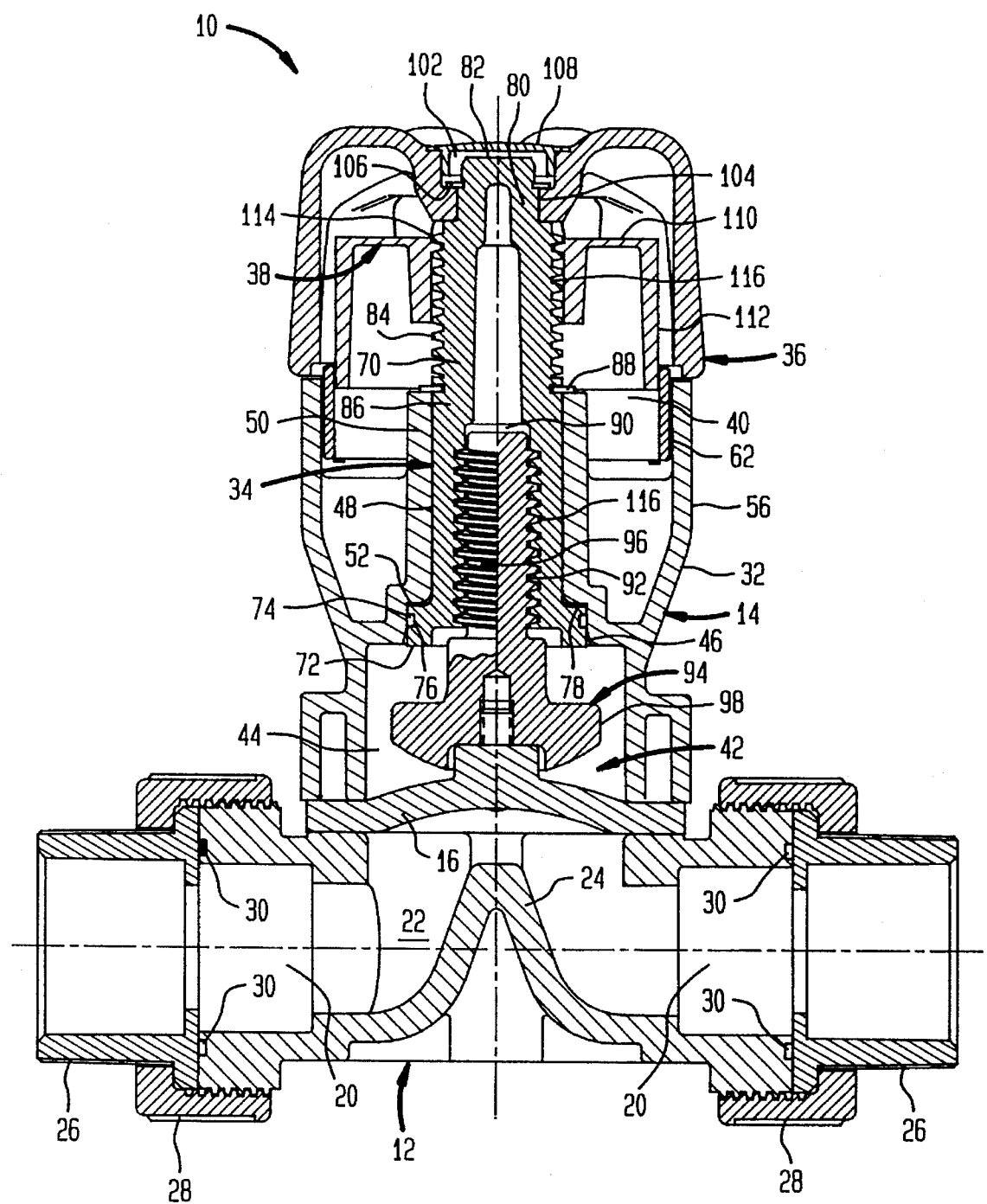
FIG. 2 is a full cross-sectional view of the valve of FIG. 1.
Figure 3:
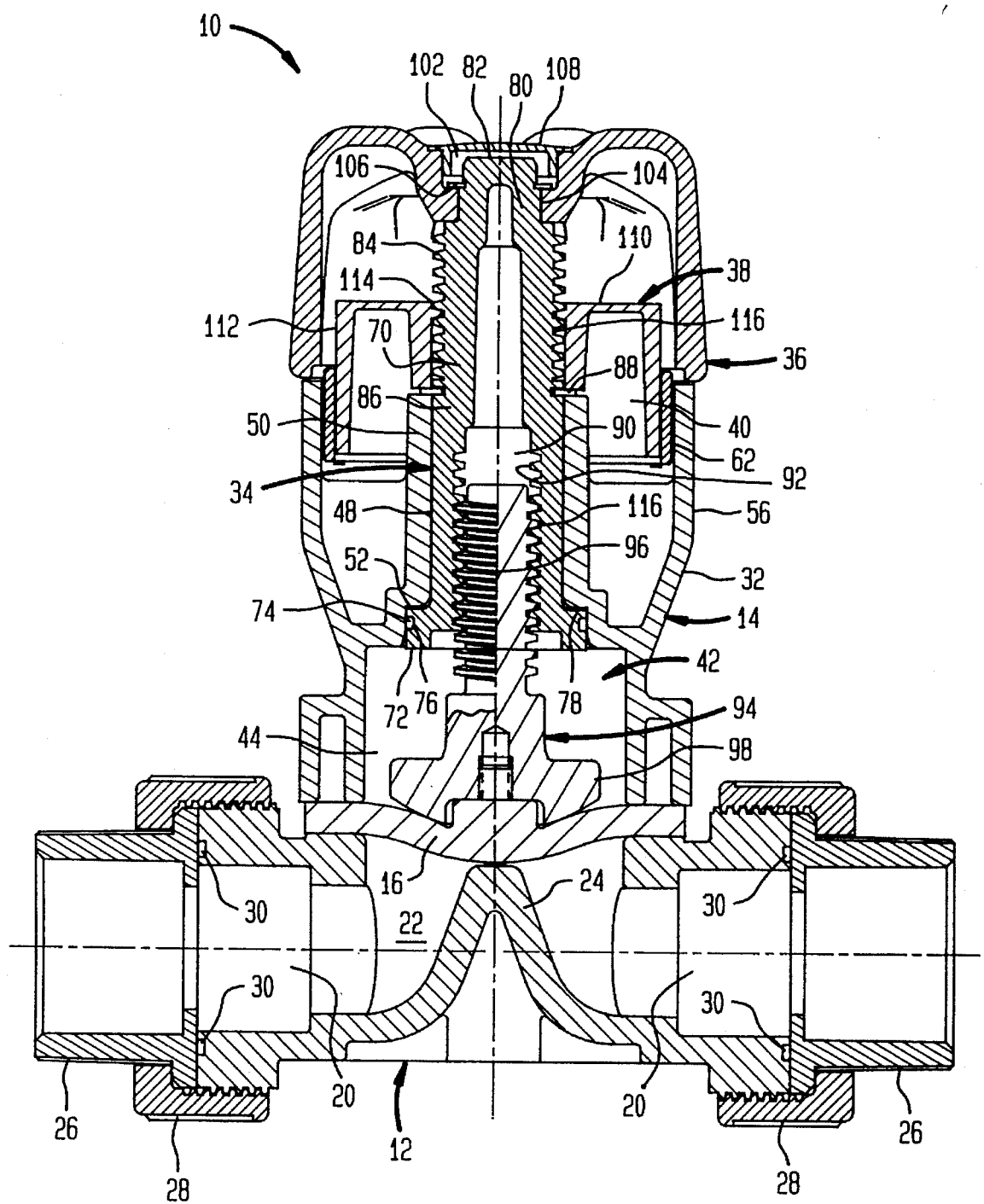
FIG. 3 is a view of the valve of FIG. 2 shown in a valve closed position.

Referring primarily to FIGS. 1–3, a manual diaphragm valve 10 includes a diaphragm body 12, a bonnet assembly 14 removably bolted to the diaphragm body 12 in a conventional manner for actuating the diaphragm valve 10 between its open position (see FIGS. 1 and 2) and its closed position (see FIG. 3) and a diaphragm 16 positioned between the diaphragm body 12 and the bonnet assembly 14. The diaphragm body 12 includes a pair of ports 20 extending outwardly from the diaphragm body 12. One of the ports 20 defines an inlet for receiving pressurized fluid while another of the ports 20 defines an outlet for discharging pressurized fluid. The diaphragm body 12 also includes a channel 22 extending between and through the ports 20. The channel 22 includes a weir 24 of the diaphragm body 12 for purposes to be discussed hereinafter. In order to provide easy connection to pipes (not shown), each port 20 is provided with an end connection 26. More particularly, the end connection 26 is mounted to a corresponding one of the ports 20 by a body nut 28. In order to provide a fluid seal at each connection, an O-ring 30 is positioned between each port 20 and its associated end connection 26.

With reference to FIGS. 1–3, the bonnet assembly 14 includes a bonnet body 32, a stem assembly 34 mounted through the bonnet body 32, a handle 36 mounted on the stem assembly 34 and an indicator 38 positioned within a chamber 40 defined by the bonnet body 32 and the handle 36 which cooperate to form a housing of the bonnet assembly 14. More particularly and with particular reference to FIGS. 1 and 4A, the bonnet body 32 includes a central passage 42 extending from a lower end of the bonnet body 32 to an upper end of the bonnet body 32. The passage 42 has a lower portion 44, an intermediate portion 46, which has a diameter smaller than the diameter of the lower portion 44, and an upper portion 48 having a diameter smaller than the diameter of the intermediate portion 46 and being defined by a substantially cylindrical extension 50 extending upwardly into the chamber 40. The passage 42 also includes a bearing surface 52 provided between the intermediate portion 46 and the upper portion 48 for purposes to be discussed hereinafter. The bonnet body 32 also includes a key 54 formed on an inner surface of a wall 56 of the bonnet body 32 and a pair of keyways (not shown) formed on a peripheral surface defining the lower portion 44 of the passage 42 for purposes to be discussed hereinafter. In addition, a plurality of slots 60 is provided in the wall 56 at the upper end of the bonnet body 32 for purposes to be discussed hereinafter.

Figure 4A:
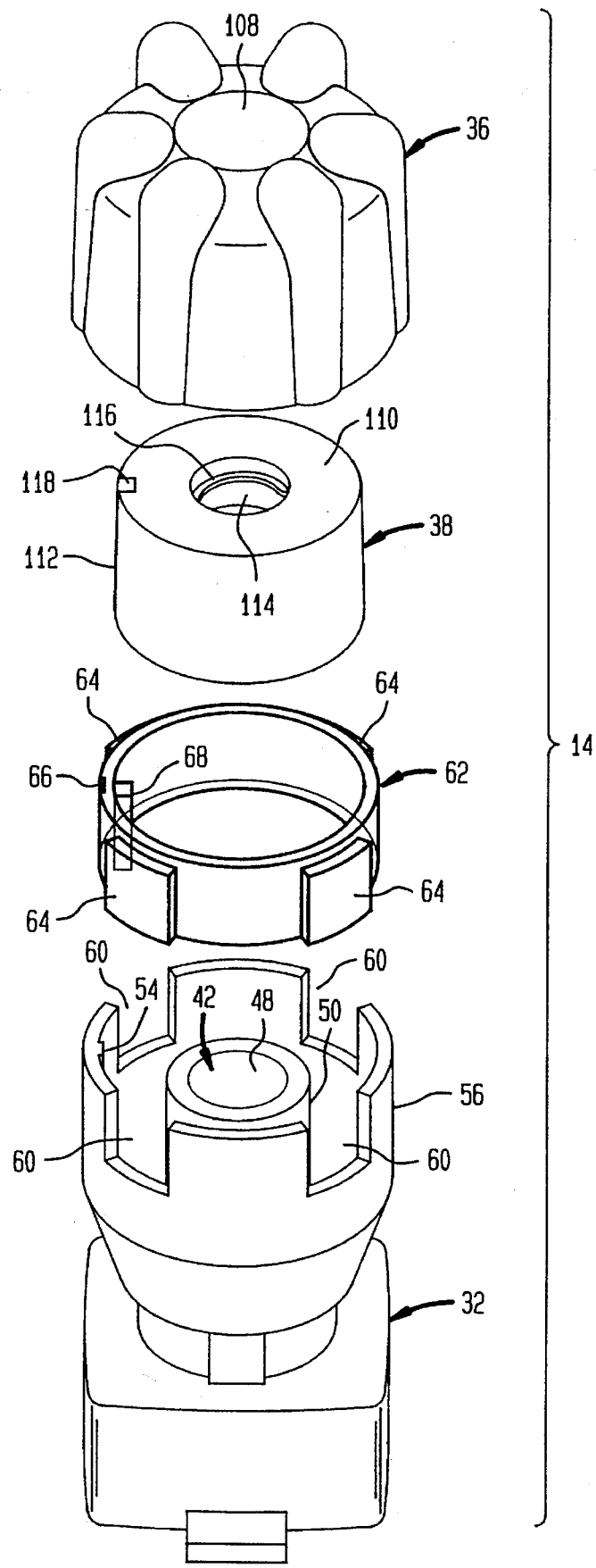
FIG. 4A is an exploded perspective view of a portion of the actuator shown in FIG. 1.

Referring to FIGS. 1 and 4A, the bonnet body 32 is also provided with a transparent annular window member 62, which has a diameter slightly smaller than the diameter of the wall 56 of the bonnet body 32 and which is removably inserted into the chamber 40 adjacent the upper end of the bonnet body 32. More particularly, the window member 62 has a plurality of windows 64 which radially and outwardly extend from the window member 62 and each of which is shaped and sized to be fitted in a corresponding one of the slots 60 such that the slots 60 and the windows 64 cooperate to form a plurality of viewing windows. The viewing windows have a substantially same axial position and a substantially same shape and size. A keyway 66 is also provided on an outer surface of the window member 62 for engaging the key 54 of the bonnet body 32, for purposes of aligning the window member 62 with the bonnet body 32, while a key 68 is provided on an inner surface of the window member 62 for purposes to be discussed hereinafter.

Figure 4B:
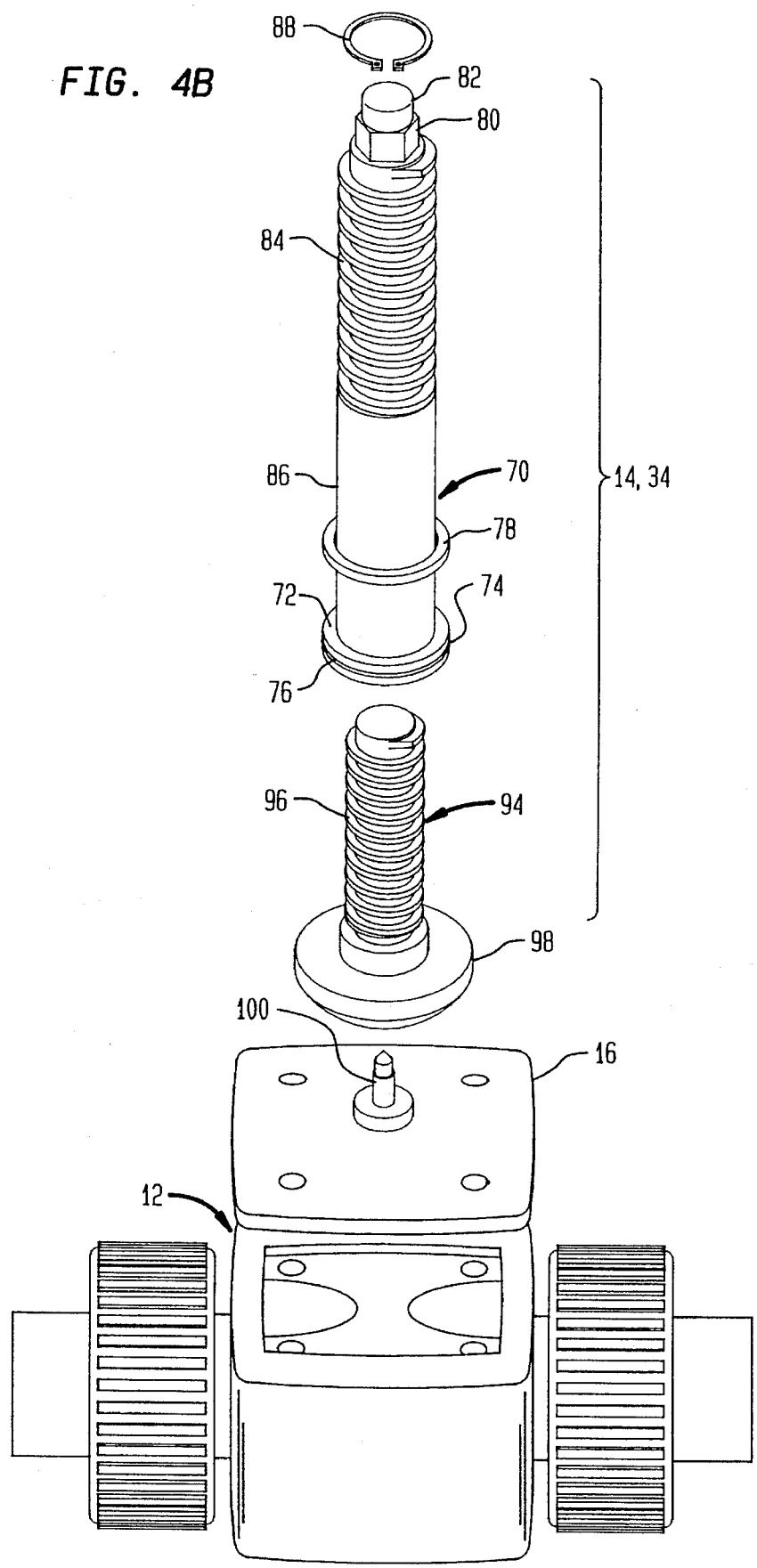
FIG. 4B is an exploded perspective view of the remainder of the actuator.

Referring to FIGS. 1 and 4B, the stem assembly 34 includes a stem 70 rotatably extending through the passage 42. More particularly, the stem 70 has a radial flange 72 at a bottom end thereof, the radial flange 72 being positioned in the intermediate portion 46 of the passage 42. A sealing member 74, such as an O-ring, is positioned in a radial groove 76, which is formed on the radial flange 72, and engages a surface defining the intermediate portion 46 of the passage 42, thereby providing a fluid seal between the surface and the radial flange 72. A thrust washer 78 is positioned between the radial flange 72 and the bearing surface 52 for reducing friction between the radial flange 72 and the bearing surface 52 and thereby minimizing the torque necessary to rotate the stem 70. The stem 70 also includes a multi-faceted surface 80 adjacent a top end thereof and an extension 82 extending upwardly from the multi-faceted surface 80. The stem 70 also includes an external threaded portion 84 adjacent the top end thereof and positioned above the passage 42 and a non-threaded portion 86 positioned between the external threaded portion 84 and the radial flange 72 and positioned within the upper portion 48 of the passage 42. The stem 70 also includes a retaining device 88 mounted thereon between the external threaded portion 84 and the non-threaded portion 86 and engaging a top end of the cylindrical extension 50. The retainer device 88, the thrust washer 78 and the bearing surface 52 cooperate to restrict the stem 70 from moving axially while allowing the stem 70 to rotate. The stem 70 also includes a hole 90 having an internal threaded portion 92 for purposes to be discussed hereinafter.

The stem assembly 34 also includes a plunger 94 having a threaded portion 96 positioned adjacent one end and threadedly engaging the internal threaded portion 92 of the stem 70 for translating a rotating movement of the stem 70 into a synchronous axial movement of the plunger 94. The plunger 94 also includes a head 98 at an opposite end thereof and positioned in the lower portion 44 of the passage 42. A pair of keys (not shown) are formed on substantially opposing portions of the head 98 and engages the keyways (not shown) formed on the peripheral surface defining the lower portion 44 of the passage 42 of the bonnet body 32, thereby preventing the plunger 94 from rotating as it moves axially. The head 98 is releasably attached to the diaphragm 16 in a conventional manner via a pin 100 (see FIG. 4B) to cause the diaphragm 16 to move axially in response to an axial movement of the plunger 94.

Referring to FIGS. 1 and 4A, the handle 36 has a dome shape and encloses the chamber 40. More particularly, the handle 36 has a diameter substantially equal to the diameter of the wall 56 of the bonnet body 32. The handle 36 also has a depression 102 at a top end thereof and a hole 104 formed in the depression 102, the hole 104 being shaped and sized to receive and engage the multi-faceted surface 80 of the stem 70. The handle 36 is releasably attached to the stem 70 by a retaining device 106 removably mounted on the extension 82 of the stem 70. The handle 36 also includes a plug 108 which is snap-fitted into the depression 102 for enclosing the depression 102.

Referring to FIGS. 1 and 4A, the indicator 38 has an inverted cup shape. More particularly, the indicator 38 includes a top flat surface 110 and a skirt portion 112 depending from the top surface 110. The top surface 110 includes an opening 114, through which the external threaded portion 84 of the stem 70 extends. More particularly, a threaded portion 116 is formed on a periphery of the opening 114 and engages the external threaded portion 84 of the stem 70 for translating a rotational movement of the stem 70 into a synchronous axial movement of the indicator 38. The skirt portion 112 of the indicator 38 includes a keyway 118 engaging the key 68 of the window member 62 to restrict the indicator 38 from rotating during its axial movement. The skirt portion 112 also has a height greater than the height of the windows 64 and a bright color such that the skirt portion 112 is readily visible through the windows 64 when the skirt portion 112 is axially aligned behind the windows 64.

Referring to FIGS. 1 and 2, when the valve 10 is in its fully open position, the plunger 94 is in its upper most position and, as a result, causes the diaphragm 16 to fully disengage the weir 24 of the diaphragm body 12, allowing fluid flow through the channel 22. Likewise, the indicator 38 is in its upper most position and is generally out of axial alignment with the windows 64. At such a position, the indicator 38 is not generally visible through the windows 64 and thereby indicates that the valve 10 is at its fully open position. To close the valve 10, the handle 36 is turned in one direction and causes the stem 70 to rotate therewith as the bearing surface 52, the retaining device 88 and the thrust washer 78 restrict the stem 70 from moving axially. As the stem 70 rotates, the internal threaded portion 92 of the stem 70 and the threaded portion 96 of the plunger 94 translate a rotating movement of the stem 70 into a synchronous axial movement of the plunger 94, while the external threaded portion 84 of the stem 70 and the threaded portion 116 of the indicator 38 translate a rotating movement of the stem 70 into a synchronous axial movement of the indicator 38. More particularly, with the plunger 94 being prevented from rotating by its associated keys and keyways (not shown), the internal threaded portion 92 of the stem 70 and the threaded portion 96 of the plunger 94 cause the plunger 94 to move downwardly to its bottom most position, causing the diaphragm 16 to sealingly engage the weir 24 of the diaphragm body 12 and thereby closing the valve 10 (see FIG. 3). Likewise, with the indicator 38 being restricted from rotating by the key 68 and the keyway 118, the external threaded portion 84 of the stem 70 and the threaded portion 116 of the indicator 38 cause the indicator 38 to move downwardly until the indicator 38 comes in contact with the retainer device 88 and comes to a rest at its bottom most position. At such a position, the skirt portion 112 is in a full axial alignment with the windows 64 (see FIG. 3) and, as a result, is visible through the entire windows 64, indicating the valve closed position. To open the valve 10 from its closed position, the handle 36 is rotated in an opposite direction, causing the plunger 94 and the indicator 38 to rise in response to a rotating movement of the stem 70 until the indicator 38 is completely out of axial alignment with the windows 64.

It should be appreciated that the present invention provides many functional advantages over the prior art device discussed above. For instance, because the handle 36 is attached to the rotatable stem 70, which does not move axially, the handle 36 does not rise or fall during the operation of the valve 10. In addition, because a rotating movement of the stem 70 is synchronously translated to axial movements of the indicator 38 and the plunger 94, the relative axial position of the plunger is continuously indicated by the amount of axial alignment of the skirt portion 112 with the windows 64 visible through the windows 64. Thus, if the plunger 94 is positioned between its upper most position (i.e., the fully open position of the valve 10) and its lower most position (i.e., the closed position of the valve 10), the skirt portion 112 is in partial axial alignment with the windows 64, and such partial axial alignment is seen through the windows 64. In addition, because the windows 64 are circumferentially provided in the wall 56 of the bonnet body 32, the indicator 38 can be viewed from many different perspectives around the valve 10.

It should be noted that the present invention may have many modifications and variations. For instance, the bearing surface 52 and the retaining device 88 may be replaced by other conventional mechanisms for restricting the stem 70 from moving axially. The keys 54, 68 and the keyways 66, 118 may also be replaced by other conventional mechanisms for preventing a rotational movement of their associated members. Further, the threaded portions 84, 92, 96, 116 may be replaced by other conventional mechanisms for translating a rotational movement of the stem 70 into axial movements of the indicator 38 and the plunger 94. The threaded portions 84, 92, 96, 116 may also be configured in such a way that as the stem 70 rotates, the indicator 38 moves upwardly while the plunger 94 moves downwardly and vice versa. Moreover, the passage 42 may have a different configuration rather than having the lower, intermediate and upper portions 44, 46, 48. Each slot 60 may also include a transparent insert defining a widow, thereby eliminating the need for the annular window member 62. In addition, the slots 60 may be formed on the handle 36. It is also possible to eliminate the handle 36 and/or replace it with other conventional mechanisms for effecting the rotation of the stem 70.

It will be understood that the embodiment described herein is merely exemplary and that a person skilled in the art may make further variations and modifications without departing from the spirit and scope of the invention. All such modifications and variations are intended to be included within the scope of the invention as defined in the appended claims.

We claim:

1. An actuator for actuating a valve from a first position to a second position and vice versa, comprising a housing; actuating means, mounted within said housing, for actuating the valve from the first position to the second position and vice versa, said actuating means including a rotatable stem mounted within said housing and restricted from moving axially and a non-rotatable plunger mounted within said stem and threadedly engaging said stem such that said plunger is axially movable in response to rotation of said stem, whereby the valve is actuated from the first position to the second position and vice versa; and indicating means for indicating the first position and the second position, said indicating means including a non-rotatable indicator member mounted within a chamber of said housing and engaging said stem such that said indicator member is axially movable between one position and another position in response to rotation of said stem.

2. The actuator of claim 1, wherein said indicating means includes viewing means for allowing said indicator member to be viewed through said housing.

3. The actuator of claim 2, wherein said viewing means includes a window formed in a wall of said housing.

4. The actuator of claim 3, wherein said indicator member is in complete axial alignment with said window when said indicator member is in said one position, whereby said indicating means indicates the first position of said valve, and said indicator member is completely out of axial alignment with said window when said indicator member is in said another position, whereby said indicating means indicates the second position of said valve.

5. The actuator of claim 4, further comprising a handle for manually rotating said stem.

6. The actuator of claim 5, wherein said handle defines a portion of said housing; and wherein said housing includes a body defining another portion of said housing, said handle and said body cooperating to form said chamber of said housing.

7. The actuator of claim 6, wherein said viewing means further includes an annular insert mounted to said body at one end of said body.

8. The actuator of claim 7, wherein said viewing means further includes a plurality of slots formed in said wall of said housing at said one end of said body adjacent said handle.

9. The actuator of claim 8, wherein said annular insert includes a plurality of extensions extending radially and outwardly from said annular insert, said slots shaped and sized to receive a corresponding one of said extensions so as to form a plurality of windows, through which said indicator member can be viewed from a plurality of different perspectives around said housing.

10. The actuator of claim 9, wherein said indicator member includes a flat surface and a skirt portion depending from said flat surface.

11. The actuator of claim 10, wherein said skirt portion is in complete axial alignment with said plurality of windows when said indicator member is in said one position, whereby said indicating means indicates the first position of said valve, and said skirt portion is completely out of alignment with said plurality of windows when said indicator member is in said another position, whereby said indicating means indicates the second position of said valve.

12. The actuator of claim 11, wherein said indicator member includes a central opening formed in said flat surface and a threaded portion formed on a periphery of said opening; and wherein said stem includes a threaded portion adjacent one end thereof, said threaded portion extending through said opening of said indicator member and engaging said threaded portion of said indicator member such that said indicator member is movable between said one position and said another position in response to rotation of said stem.

13. The actuator of claim 12, wherein said skirt portion of said indicating means is in partial alignment with said plurality of windows when said indicator member is positioned between said one position and said another position, whereby said indicating means indicates a relative position of the valve between the first position and the second position.

14. The actuator of claim 13, wherein said plurality of windows has a substantially same axial position and a substantially same shape and size.

15. The actuator of claim 14, wherein said body includes a key for engaging a keyway formed on said annular insert.

16. The actuator of claim 15, wherein said annular insert includes a key for engaging a keyway formed on said skirt portion of said indicator member so as to restrict said indicator member from rotating as it moves between said one position and said another position.

17. The actuator of claim 16, wherein said body includes a central passage, through which said stem and said plunger extend, and a cylindrical extension extending into said chamber and defining a portion of said central passage.

18. The actuator of claim 17, wherein said stem includes a radial flange at another end thereof for engaging a bearing surface formed within said central passage and a retainer mounted on said stem between said threaded portion and said another end for engaging an end of said cylindrical extension, whereby said retainer and said bearing surface restrict said stem from moving axially as it rotates.

19. The actuator of claim 18, wherein said plunger includes a head axially movable within one end of said central passage.

20. The actuator of claim 19, wherein said stem includes a hole adjacent said another end thereof so as to threadedly receive a threaded portion of said plunger opposite said head such that said plunger is axially movable in response to rotation of said stem.

21. The actuator of claim 20, wherein said stem includes a multi-faceted portion between said threaded portion and said one end of said stem for engaging an opening formed in said handle such that said stem is rotatable in response to rotation of said handle.

22. The actuator of claim 21, further comprising a thrust washer positioned at an interface between said radial flange of said stem and said bearing surface for reducing friction at said interface.

23. An actuator for actuating a valve from a first position to a second position and vice versa, comprising a housing; actuating means, mounted within said housing, for actuating the valve from the first position to the second position and vice versa, said actuating means including a rotatable stem mounted within said housing; and indicating means for indicating the first position and the second position, said indicating means including an indicator member mounted within said housing and engaging said stem such that said indicator member is axially movable between one position and another position in response to rotation of said stem and viewing means for allowing said indicator member to be viewed through a wall of said housing from a plurality of different perspectives around said housing, said indicator member including a flat surface and a skirt portion depending from said flat surface, said viewing means including an annular insert mounted to said housing, said annular insert including a plurality of extensions extending radially and outwardly from said annular insert, and said housing including a plurality of slots, each of which is formed in a wall of said housing and is shaped and sized so as to receive a corresponding one of said extensions, said extensions and said slots cooperating to form a plurality of windows through which said indicator member can be viewed from a plurality of different perspectives around said housing.

24. The actuator of claim 23, wherein said skirt portion is in complete axial alignment with said plurality of windows when said indicator member is in said one position, whereby said indicating means indicates the first position of said valve, and said skirt portion is completely out of alignment with said plurality of windows when said indicator member is in said another position, whereby said indicating means indicates the second position of said valve.

25. The actuator of claim 24, wherein said indicator member including a central opening formed in said flat surface and a threaded portion formed on a periphery of said opening; and wherein said stem includes a threaded portion adjacent one end thereof, said threaded portion extending through said opening of said indicator member and engaging said threaded portion of said indicator member such that said indicator member is movable between said one position and said another position in response to rotation of said stem.

26. The actuator of claim 25, wherein said skirt portion of said indicating means is in partial alignment with said plurality of windows when said indicator member is positioned between said one position and said another position, whereby said indicating means indicates a relative position of the valve between the first position and the second position.

27. An actuator for actuating a valve from a first position to a second position, comprising a housing having a dome shaped handle, which defines one portion of said housing, and a body, which defines another portion of said housing; a stem mounted within said housing through said body and releasably attached to said housing so as to rotate in response to rotation of said handle, said stem being restricted from moving axially; and indicating means for indicating the first position of the valve and the second position of the valve, said indicating means including a non-rotatable indicator member, which is positioned within a chamber of said housing defined by said handle and said body and which engages said stem such that said indicator member is axially movable from one position to another position in response to rotation of said stem, and viewing means for allowing said indicator member to be viewed through said housing.

* * * * *